J. H. MYERS.

SHIRT.

No. 6,749. Reissued Nov. 16, 1875.

WITNESSES:

Jas. E. Hutchinson

John R. Young

INVENTOR.

James H. Myers, by Prindle and Hopkins attorneys

N. PETERS, PHOTO-LITHOGRAPHER, WASHINGTON, D. C.

UNITED STATES PATENT OFFICE.

JAMES H. MYERS, OF MONTREAL, CANADA, ASSIGNOR TO OLIVER H. KEEP, OF NEW YORK CITY.

IMPROVEMENT IN SHIRTS.

Specification forming part of Letters Patent No. 123,721, dated February 13, 1872; reissue No. 6,749, dated November 16, 1875; application filed September 14, 1875.

*To all whom it may concern:*

Be it known that I, JAMES H. MYERS, of Montreal, Province of Quebec, Dominion of Canada, did invent certain new and useful Improvements in Shirts, for which Letters Patent No. 123,721 were issued to me upon the 13th day of February, 1872, which Letters Patent have been found defective in that the specification and claims do not cover and embrace all of the original invention, as set forth in the application filed in the Patent Office on the 18th day of January, 1872. Now, therefore, being desirous of reissuing said Letters Patent, herewith surrendered, I have prepared, and do hereby declare that the following is a full, clear, and exact description of the said invention, reference being had to the accompanying drawings, making a part of this specification, in which—

Figure 1:
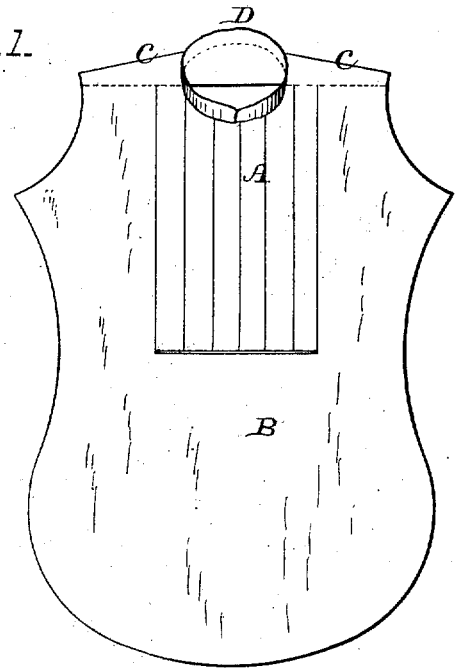
Figure 2:
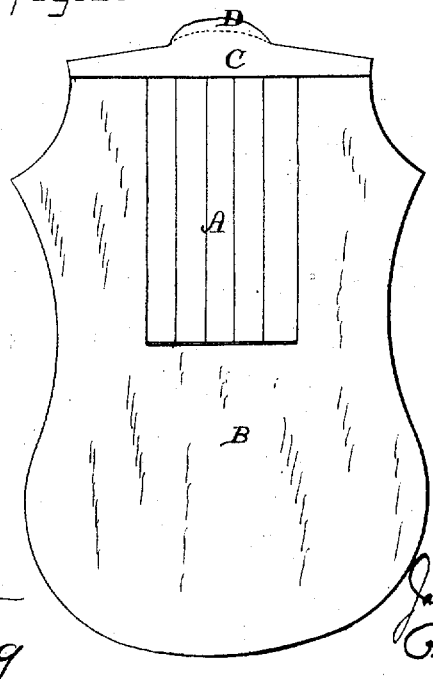

Figure 1 is a view of the front side of a partially-completed shirt embodying my invention, and Fig. 2 is a like view of its rear side.

Letters of like name and kind refer to like parts in each of the figures.

In the construction of gentlemen's shirts but few, comparatively, have sufficient skill to enable them to properly fit certain portions of the garment, more especially those which embrace the neck and shoulders, from which lack of skill much inconvenience arises.

To remedy this difficulty is the object of my invention, which consists, as a new article of manufacture, in a partial shirt with a body, and having a bosom and collar-band complete in themselves and fitted at the neck, the several parts being constructed and combined for use, substantially as and for the purpose hereinafter specified.

In the use of my invention I preferably construct the shirt as shown in the annexed drawings, in which—

A represents the bosom, B the front, C the yoke, and D the neck-band, of a shirt, combined in such a manner as to cause them to conform to the shape of a person having a certain chest and neck measurement, and a certain slope of the shoulders. The article thus constituted is complete in itself, and, in various sizes, may be sold as an article of commerce.

In order to complete the shirt described it is only necessary that the back and sleeves should be added, and as this portion of the work requires but little skill, and as the article of manufacture can be furnished at a less cost than would be possible if each were made separately and by hand, its sale enables any person to have well-fitted shirts, and also materially reduces the cost of the same by rendering available comparatively unskilled labor.

Having thus fully set forth the nature and merits of my invention, what I claim as new is—

As a new article of manufacture, a partial shirt, composed of a whole front part, B, a bosom, and a collar-band, the two latter complete in themselves, and fitted at the neck, the several parts being constructed and combined for use, substantially as and for the purpose specified.

In testimony whereof I hereunto set my hand this 8th day of September, 1875.

JAMES H. MYERS. [L. S.]

Witnesses:

G. A. HOLMES,

O. P. BLOSS.